(12) United States Patent
Stothers et al.

(10) Patent No.: US 7,874,788 B2
(45) Date of Patent: Jan. 25, 2011

(54) FLOW ENHANCEMENT FOR UNDERWATER TURBINE

(75) Inventors: Russell Stothers, Vancouver (CA); Emmanuel Grillos, Bellevue, WA (US)

(73) Assignee: Clean Current Limited Partnership, Vancouver, B.C. (CA)

( * ) Notice: Subject to any disclaimer, the term of this patent is extended or adjusted under 35 U.S.C. 154(b) by 681 days.

(21) Appl. No.: 11/663,001

(22) PCT Filed: Feb. 24, 2005

(86) PCT No.: PCT/CA2005/000267

§ 371 (c)(1),
(2), (4) Date: Aug. 27, 2007

(87) PCT Pub. No.: WO2006/029496

PCT Pub. Date: Mar. 23, 2006

(65) Prior Publication Data

US 2007/0284884 A1    Dec. 13, 2007

(30) Foreign Application Priority Data

Sep. 17, 2004   (CA) .................................. 2481820

(51) Int. Cl.
*F03D 1/02* (2006.01)
(52) U.S. Cl. .................. 415/4.5; 415/60; 415/148; 415/908
(58) Field of Classification Search ................ 415/4.5, 415/4.3, 60, 211.2, 905, 908, 906, 148; 290/44, 290/55
See application file for complete search history.

(56) References Cited

U.S. PATENT DOCUMENTS

| 654,654 A | 7/1900 | Lawrence |
| 1,123,491 A | 1/1915 | Corbin |
| 1,326,730 A | 12/1919 | Helguera |
| 1,486,186 A | 3/1924 | Gulbransen |
| 1,493,154 A | 5/1924 | Harza |
| 1,835,018 A | 12/1931 | Darrieus |
| 2,471,892 A | 5/1949 | Price |

(Continued)

FOREIGN PATENT DOCUMENTS

CA    2460479 A    3/2003

(Continued)

OTHER PUBLICATIONS

WIPO, International Search Report for PCT/CA2007/000181, May 1, 2007, 4 pages.

(Continued)

*Primary Examiner*—Igor Kershteyn
(74) *Attorney, Agent, or Firm*—Michael R. Schacht; Schacht Law Office, Inc.

(57) ABSTRACT

A flow enhancement improvement for an underwater turbine generator (10) is disclosed wherein a longitudinal hole (240) is disposed in the central area (26), typically a hub (20) of the generator (10), and a second, augmentor duct (41), preferably rigid, is disposed about the outer duct (40) or housing of the unit to create a slot (200) area. The slot (200) and hollow hub (20) create areas of smooth, laminar fluid flow. The leading edges of the hub (20) or central ring and the augmentor (41) and outer ducts (40) are elliptical to enhance the fluid dynamics of the structure.

12 Claims, 7 Drawing Sheets

U.S. PATENT DOCUMENTS

| | | | |
|---|---|---|---|
| 2,501,696 A | | 3/1950 | Souczek |
| 2,509,442 A | | 5/1950 | Matheisel |
| 2,652,505 A | | 9/1953 | Matheisel |
| 2,782,321 A | | 2/1957 | Fischer |
| 3,323,592 A | | 6/1967 | Brandon |
| 3,504,990 A | | 4/1970 | Sugden |
| 3,740,565 A | | 6/1973 | Wesley |
| 3,922,574 A | | 11/1975 | Whiteley |
| 3,980,894 A | | 9/1976 | Vary et al. |
| 3,986,787 A | | 10/1976 | Mouton et al. |
| 4,025,220 A | | 5/1977 | Thompson et al. |
| 4,095,918 A | | 6/1978 | Mouton, Jr. et al. |
| 4,132,499 A | * | 1/1979 | Igra ................ 415/210.1 |
| 4,140,433 A | | 2/1979 | Eckel |
| 4,159,188 A | | 6/1979 | Atencio |
| 4,163,904 A | | 8/1979 | Skendrovic |
| 4,166,596 A | * | 9/1979 | Mouton et al. ........... 244/30 |
| 4,219,303 A | | 8/1980 | Mouton |
| 4,221,538 A | | 9/1980 | Wells |
| 4,313,711 A | | 2/1982 | Lee |
| 4,320,304 A | * | 3/1982 | Karlsson et al. .......... 290/55 |
| 4,324,985 A | | 4/1982 | Oman |
| 4,367,413 A | | 1/1983 | Nair |
| 4,368,392 A | | 1/1983 | Drees |
| 4,385,492 A | | 5/1983 | Lee |
| 4,417,446 A | | 11/1983 | Nakamoto et al. |
| 4,421,990 A | | 12/1983 | Heuss et al. |
| 4,468,153 A | | 8/1984 | Atencio |
| 4,476,396 A | | 10/1984 | Calvert, Jr. |
| 4,524,285 A | | 6/1985 | Rauch |
| 4,593,527 A | | 6/1986 | Nakamoto et al. |
| 4,648,788 A | | 3/1987 | Jochum |
| 4,720,640 A | | 1/1988 | Anderson et al. |
| 4,755,690 A | | 7/1988 | Obermeyer |
| 4,781,522 A | | 11/1988 | Wolfram |
| 5,228,800 A | | 7/1993 | Akai |
| 5,464,320 A | * | 11/1995 | Finney ................ 415/60 |
| 5,477,091 A | | 12/1995 | Fiorina et al. |
| 5,592,816 A | | 1/1997 | Williams |
| 5,825,094 A | | 10/1998 | Hess |
| 5,982,070 A | | 11/1999 | Caamano |
| 6,049,188 A | | 4/2000 | Smith |
| 6,139,255 A | | 10/2000 | Vauthier |
| 6,146,096 A | | 11/2000 | Winkler |
| 6,168,373 B1 | | 1/2001 | Vauthier |
| 6,281,597 B1 | | 8/2001 | Obermeyer |
| 6,285,090 B1 | | 9/2001 | Brutsaert et al. |
| 6,382,904 B1 | * | 5/2002 | Orlov et al. ............ 415/4.5 |
| 6,406,251 B1 | | 6/2002 | Vauthier |
| 6,476,513 B1 | | 11/2002 | Gueorguiev |
| 6,648,589 B2 | | 11/2003 | Williams |
| RE38,336 E | | 12/2003 | Williams |
| 6,836,028 B2 | | 12/2004 | Northrup et al. |
| 7,042,109 B2 | | 5/2006 | Gabrys |
| 2002/0088222 A1 | | 7/2002 | Vauthier |
| 2005/0179264 A1 | | 8/2005 | Ganev |

FOREIGN PATENT DOCUMENTS

| | | |
|---|---|---|
| CH | 684430 | 9/1994 |
| CN | 85201823 | 3/1986 |
| DE | 1028948 | 4/1958 |
| EP | 0045202 | 2/1982 |
| EP | 1338793 | 8/2003 |
| FR | 026223 | 9/1923 |
| FR | 866053 | 6/1941 |
| FR | 891697 | 3/1944 |
| FR | 56102 | 9/1952 |
| FR | 2527803 | 12/1983 |
| FR | 2660701 | 10/1991 |
| GB | 2348250 | 9/2000 |
| JP | S50-094339 | 7/1975 |
| JP | S55-5402 | 1/1980 |
| JP | 55072665 | 5/1980 |
| JP | 56077565 | 6/1981 |
| JP | S61-192859 | 8/1986 |
| JP | S62-38876 | 2/1987 |
| JP | S62-71381 | 5/1987 |
| JP | H03-222869 | 10/1991 |
| JP | H06-87671 | 12/1994 |
| JP | H08-338354 | 12/1996 |
| JP | H10-115278 | 5/1998 |
| JP | 2000-213446 | 8/2000 |
| JP | 2000-240552 | 9/2000 |
| NL | 9400050 | 8/1995 |
| NL | 1012489 | 11/2000 |
| WO | 0028210 | 5/2000 |
| WO | 0050769 | 8/2000 |
| WO | 0055440 | 9/2000 |
| WO | 0106122 | 1/2001 |
| WO | 0125627 | 4/2001 |
| WO | 2008014584 | 2/2008 |

OTHER PUBLICATIONS

Curran and Gato, "The Energy Conversion Performance of Several Types of Wells Turbine Designs", Proc. Inst. Mech. Engrs. vol. 211 Part A, 1977.

Davis, Barry V., Nova Energy Ltd., "A Major Source of Energy From the World's Oceans", IECEC-97 Conference, Jul. 31, 1997, Honolulu.

Davis, Barry V., Nova Energy Ltd., "Water Turbine Model Trials", Report No. NEL 002, 1980.

Phillips, D. G., et al., Diffuser Development for a Diffuser Augmented Wind Turbine using Computational Fluid Dynamics, 2000, pp. 1-10, University of Auckland, New Zealand.

Dixon, S. L., Fluid Dynamics, Thermodynamics of Turbomachinery, 4th ed., 1996, University of Liverpool, pp. 124-133.

Vortec Energy, Information Memorandum, Nov. 20, 2001, pp. 1-15, Vortec Energy, New Zealand.

Kirke, Brian, Developments in Ducted Water Current Turbines, Tidal Paper, Aug. 16, 2003, pp. 1-12, School of Engineering, Griffith University, Australia.

* cited by examiner

US 7,874,788 B2

FLOW ENHANCEMENT FOR UNDERWATER TURBINE

1. TECHNICAL FIELD

The present invention relates generally to underwater ducted turbines for hydrokinetic electrical power generation. More specifically, a dual augmentor duct structure defining a slot and a longitudinal hole through the hub of the turbine which enhances water flow are disclosed.

2. BACKGROUND OF THE INVENTION

Bi-directional, rim generating, ducted underwater turbines for generating electrical power are known, such as the applicant's PCT application PCT/CA02/01413 to Davis et al. There is a desire to improve the flow characteristics, and therefore, the efficiency of such designs. Fixed augmentors are known to increase flow through the turbine.

U.S. Pat. No. 4,219,303 to Mouton et al. disclosed a rigid inner primary nozzle within a flexible outer nozzle which slightly overlaps the primary nozzle, creating a space between the nozzles for uni-directional flow.

U.S. Pat. No. 6,406,251 B1 to Vauthier disclosed a system of pivoting flaps on the exterior surface of a hydroturbine accepting bi-directional flow. However, this system is mechanically complicated.

The theoretical advantage of a slot in the duct of a conventional, uni-directional flow turbine with single duct was discussed in Kirke, B. *Developments in Ducted Water Current Turbines*, School of Engineering, Griffiths University.

It is also known to have a central space through a hydroturbine generator. U.S. Pat. No. 2,509,442 to Matheisel disclosed a ducted propeller turbine with no hub or root section to the blade which is prone to excessive deflection, vibration and high cycle fatigue, particularly as without an inner support ring the blades are cantilevered towards the centre of the unit from the housing.

U.S. patent RE38,336E (Reissue of U.S. Pat. No. 5,592,816) to Williams disclosed a hydroelectric turbine with a central open area of unrestricted flow surrounded by the blades which proposed reducing down current turbulence. U.S. Pat. No. 6,648,589 B2, also to Williams, disclosed a hydroelectric turbine with a central open area of unrestricted flow surrounded by the blades to aid in increasing the velocity of the water flowing through the single blade and to eliminate the turbulence that occurs behind the hub in traditional hub generator hydroelectric turbines. The Williams patents employ complicated hydraulic and mechanically driven generators with a uni-directional turbine blade configuration without ducting nor hydrodynamic structures to direct water flow in an efficient manner. The Williams patents do not incorporate a set of bearings at the hub to improve the structural integrity of the unit and reduce blade deflection.

The present invention satisfies the need for a structurally and mechanically simple and inexpensive to manufacture flow enhancement design which increases water flow, provides a bypass for sea life and debris thereby reducing the environmental impact of the unit, reduces vibration and hydrodynamic drag and increases the operating efficiency of underwater ducted turbines.

3. SUMMARY OF THE INVENTION

It is an object of the present invention to implement an improved hydro turbine generator and method of flow enhancement wherein the improvement comprises a slot between a duct or housing and an augmentor device which is disposed about the duct. The augmentor device optimally has an inlet and an outlet which are substantially similar in area and a narrower central throat portion, thereby increasing the efficiency of the turbine. Specific optimal ratios of the throat area, slot area and the blade area to the inlet area are disclosed which further optimize the efficiency of the turbine.

The augmentor may be partial, or a complete second duct disposed about substantially all of the outer surface of the first duct, thereby creating a dual duct structure.

Another object of the present invention is to provide an augmentor which is axi-symmetric, with leading edges having hydrodynamic profiles, thereby minimizing turbulent water flow past the inlet and outlet and performing optimally in bi-directional water flow. The dual duct structure may be coated with an anti-fouling coating and may include buoyancy material, thereby achieving greater noise suppression, ensuring minimal environmental impact and providing corrosion resistance and high lubricity.

Another object of the present invention is to provide a flow enhancement structure in a turbine comprising a longitudinal hole substantially along the longitudinal axis of the turbine in a hub having specific shape, structural and material characteristics, thereby improving the efficiency of the turbine. Specific ratios of the hole area to the blade area are disclosed. The hole, combined with the flow characteristics of the hub, renders the turbine safe in relation to marine life.

4. BRIEF DESCRIPTION OF THE DRAWINGS

The apparatus and method of the present invention will now be described with reference to the accompanying drawing figures, in which.

5. DETAILED DESCRIPTION OF THE INVENTION

Figure 1:
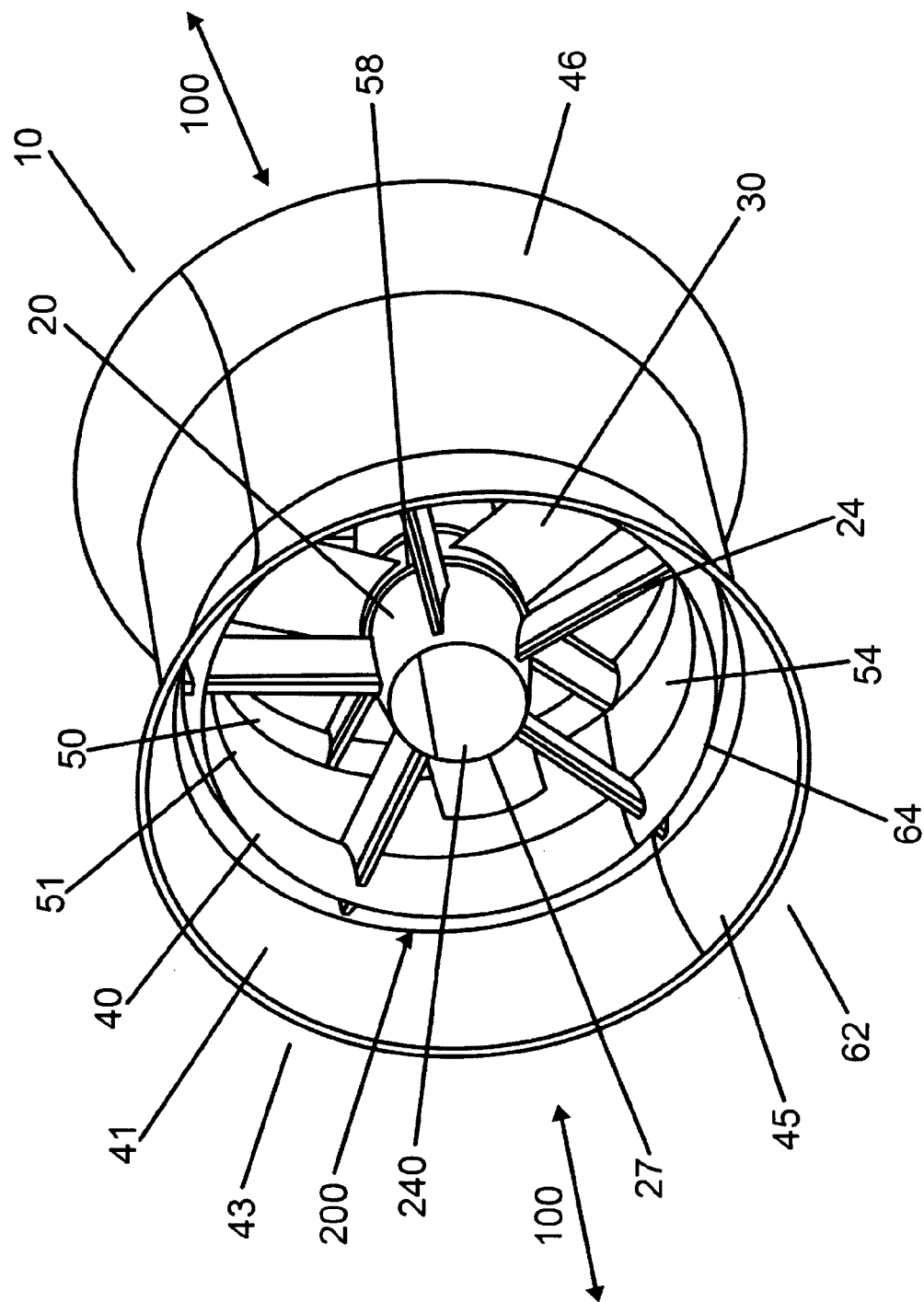
FIG. 1 is an isometric view of the dual augmentor duct underwater turbine generator with slot and hollow hub flow enhancement structures according to the invention.

Referring to FIG. 1, an isometric view of the dual augmentor duct underwater turbine generator 10 with slot 200 and hollow hub 240 flow enhancement structures of the preferred embodiment is shown. In the preferred embodiment, the underwater ducted turbine 10 is of the type disclosed in the applicants' earlier invention the subject of PCT/CA02/01413 application to Davis et al., with the present improvement being directed towards a hollow hub 20 design and second, augmentor duct 41 disposed about the outer duct 40 with a slot 200 between the two ducts 43, which together enhance water flow 100 and increase efficiency of the turbine generator 10. The dual augmentor duct structure 43 is a fore and aft symmetric structure, namely it is symmetrical about a central vertical plane which transects the turbine generator 10 laterally. The dual duct structure 43 is disposed about the turbine rotor 50 and all generator components which are housed in the outer duct 40. The augmentor duct 41 has symmetrical inlet portions 45 and 46 creating a highly efficient duct for bi-directional flow. The central hole 240 may also be employed in units 10 without a hub, for instance with cantilevered blades disposed radially towards a central portion of the turbine generator. The central hole 240 may also be employed in non-ducted turbine generators 10.

The dual duct structure 43 is secured to the hub 20 by a plurality of struts 24 which also act as guide vanes in the annulus 51 area. The struts 24 are merely struts in the slot 200 area and not curved guide vanes. In the preferred embodiment there are five guide vanes 24 at each of the two ends of the turbine generator 10. The vanes 24 are preferably evenly spaced radially about the hub 20 axis. In the preferred embodiment, two counter-rotating rotor disks 50 are rotatably attached to the hub 20 and a plurality of blades 30, optimally symmetric hydrofoil blades, extend radially from said hub 20 to a rotor rim 54 which seats in a groove (not shown) in the interior surface of the outer duct 40 and is rotatable in a bearing race, or in a variation, a magnet bearing race. In other variations, single or multiple rotor disks 50 may be employed. The flow enhancement slot 200 and hole 240 structures may be employed not only for tidal applications, but also for other turbine generation applications, as one skilled in the art can appreciate.

In the preferred embodiment the dual augmentor duct 43 is a rigid structure manufactured from composite material. The dual augmentor duct 43 may be made from any composite material such as fiberglass, Kevlar™, carbon fiber, fiber-reinforced concrete or any other combination known in the art. Advantages of the rigid, symmetrical dual duct 43 arrangement include simplicity of manufacture, installation and maintenance and low capital cost. In a variation, a stainless steel rigid frame covered by a flexible composite material is used.

The interior wall of the augmentor duct 41 diverges towards the augmentor duct rim 62, thereby producing a decelerating effect downstream of the turbine blades as the water 100 flows through the duct 20. The outer surface of the augmentor duct 41 is concave in the preferred embodiment, but may be convex or cylindrical. Both ends of the dual augmentor duct 43 are effectively inlets as the turbine generator 10 is bidirectional. The central portion of the augmentor duct 41, is cylindrical. In operation, water flow 100 converges as it passes the inlet rim 62 and follows the profile of the augmentor duct 41 and outer duct 40. The gap or slot 200 between the outer duct 40 and augmentor ducts 41 is a smooth annular flow area. The blade tips 30 and rotor rim 54 (not shown here) are contained in annulus 51 and are not disposed in the slot 200. After the water flow 100 passes the rotor disks 50, the outer duct 40 and augmentor duct 41 diverge again, to allow for the smooth diffusion of the water flow 100 back to free stream conditions. The symmetry of the dual augmentor duct 43 achieves high hydraulic efficiencies in a bi-directional tidal environment. In the preferred embodiment, the duct entry 45 and exit 46 are axi-symmetric. Alternate configurations such as square, rectangular or any other arbitrary shape may be employed as dictated by the parameters of specific sites or applications such as tidal regime and local bathymetry. The optimal shape for each site is determined by performing a computational fluid dynamic analysis of the site. The preferred embodiment, however, is axi-symmetric.

The optimal design is further characterized by an inlet area 45 (augmentor duct rim 62) equal to the exit area 46 (opposite augmentor duct rim 62) and a throat area, turbine blade area, or annulus 51 (cylindrical section) that is optimally between nine-tenths (0.9) to one quarter (0.25) of the exit area 46 depending on the site-specific tidal conditions. The annulus 51 is the area between the inner surface of the outer duct 40 and the outer surface of the hub 20 through which the turbine blades 30 pass. In the preferred embodiment, for general applications, the ratio of the central throat or inner surface of the outer duct 40 central portion to the augmentor duct rim 62 diameter is 0.5. In variations the ratio may be between 0.1 and 0.9.

The leading and trailing edges or rims of both ducts 43 (including outer duct 40 rim 64) optimally have a hydrodynamic profile with a cross section that is similar in shape to an airplane wing. This profile increases the flow 100 into the turbine annulus as well as creates a smooth transition of the flow 100 into the adjacent slot 200 and around the entire tidal turbine generator 10.

In the preferred embodiment, an anti-fouling coating, such as Si-Coat 560™, is applied to the ducts 43. In a variation, specific areas susceptible to the buildup of aquatic organisms are coated. The anti-foul coating has the additional benefit of providing a high lubricity surface which facilitates laminar flow, thereby improving the efficiency of the turbine generator 10.

Buoyancy material is incorporated into the internal structure of the dual augmentor duct 43 and the generator housing 92 in order to increase the overall buoyancy of the tidal turbine generator 10. Neutral buoyancy is a key characteristic of the unit as it facilitates the process of unit removal and maintenance. In the preferred embodiment, the ducts 43 are comprised of a composite shell structure filled with poly vinyl chloride closed cell marine foam (not shown) in order to achieve neutral buoyancy for the entire tidal turbine generator 10. Other closed cell foams, as known in the art, may also be employed. In addition to the buoyancy function, the closed cell foam acts as a noise suppression device by attenuating the hydrodynamic and electrical noise produced by the tidal generator 10, thus mitigating any possible acoustic impacts of the tidal turbine generator 10 on cetaceans and other marine mammals.

The second unique flow characteristic is a longitudinal hole 240 through the hub 20. The inner surface of the hub 20 is optimally cylindrical. The outer surface of the hub is optimally elliptical, or barrel shaped, rising from the hub rim 27 to an apex in the flat central portion of the hub 20. The inner surface of the hub 20 defines the longitudinal hole 240 along the hub 20 axis. In other variations, the profiles are varied as determined by a computational fluid dynamic analysis of the specific tidal site.

Figure 2:
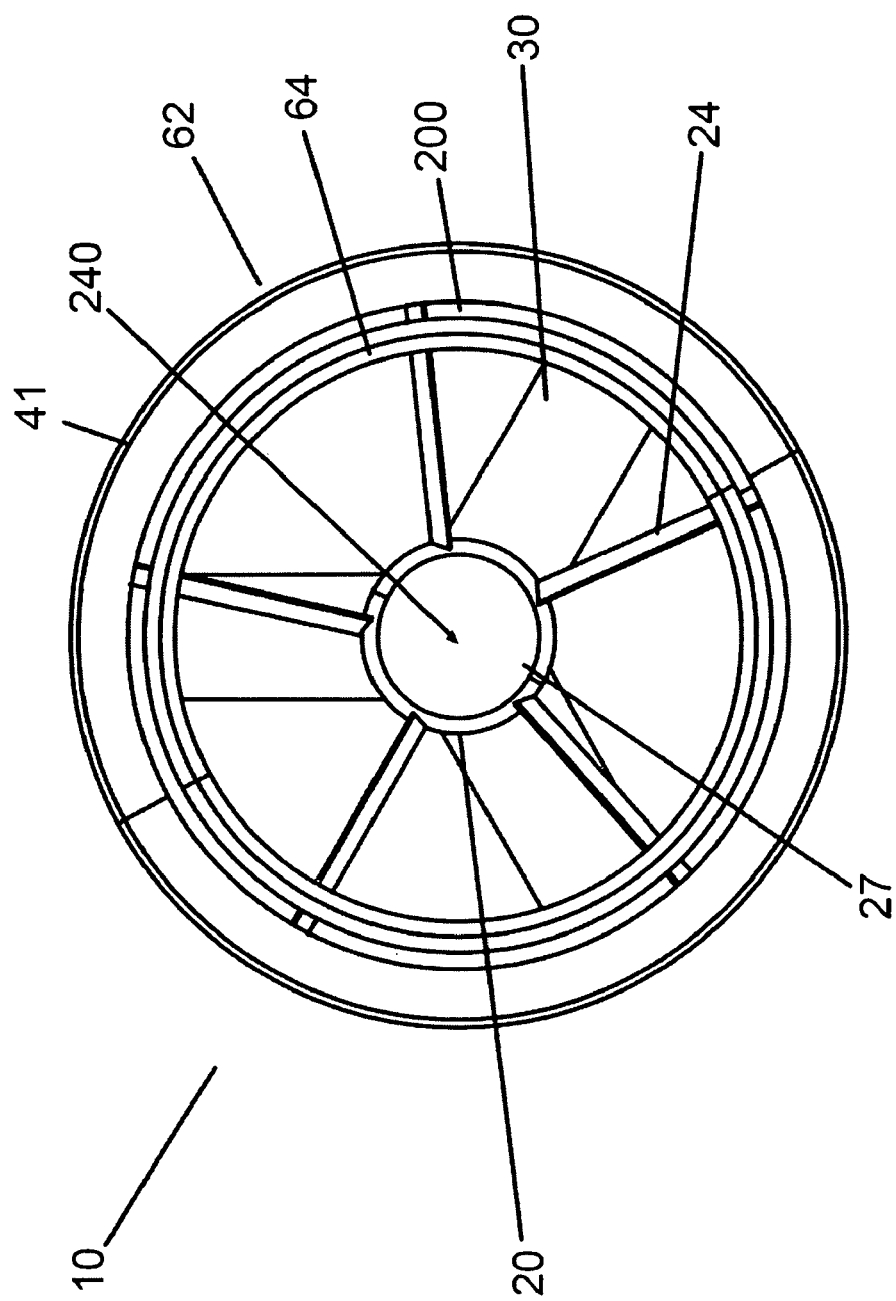
FIG. 2 is a front elevation view of the dual duct underwater turbine generator with slot and hollow hub flow enhancement structures according to the invention.

Referring now to FIG. 2, a front elevation view of the dual augmentor duct underwater turbine generator with slot 200 and hollow hub 240 flow enhancement structure is shown. The leading edge of the outer duct rim 64, hub rim 27, curved nature of the guide vanes 24 in the preferred embodiment, followed by the blades 30 and surrounded by the outer duct 40 are shown.

Figure 3:
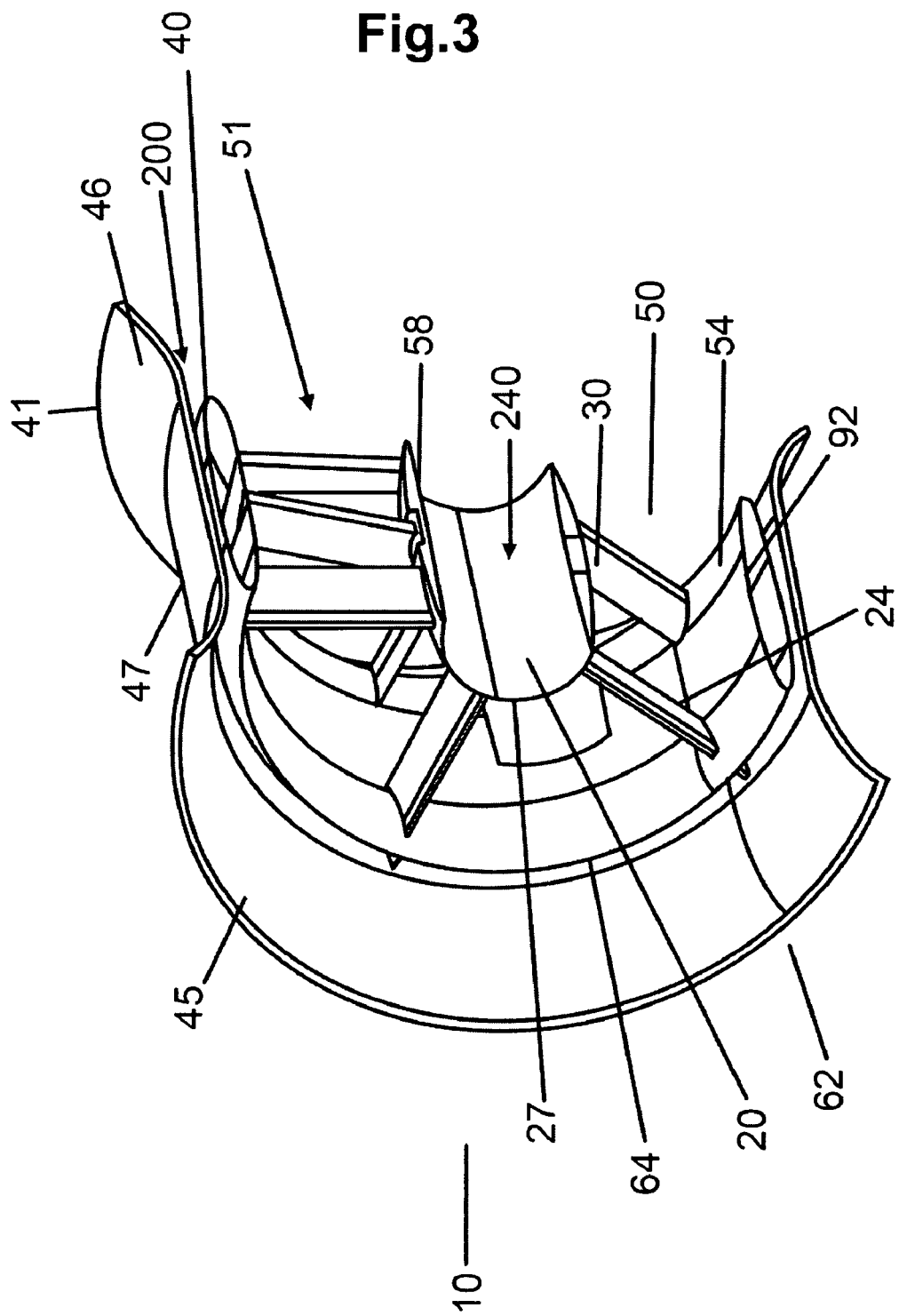
FIG. 3 is a cut-away perspective view of the dual augmentor duct underwater turbine generator with slot and hollow hub flow enhancement structures according to the invention.

Now referring to FIG. 3, a cut away perspective view of the slot 200 through the tidal turbine generator 10 is shown. The slot 200 is defined by an upper surface, which is formed by the inner surface of the augmentor duct 41, and a lower surface formed by the outer surface of the outer duct 40, which encloses the generator housing 92. The augmentor duct 41 is comprised of an inlet area 45, throat area 47 and exit area 46, which reverse with each flow 100 reversal. The lower surface of the slot 200, in the preferred embodiment, is cylindrical with leading edge or outer duct rim 64 providing a smooth entry for the water flow 100 into both the slot 200 and the turbine annulus or rotor disk area 51. The blades 30 are disposed in a rotor rim or ring 54.

In variations, depending on the results from specific computational fluid dynamics ("CFD") analyses, the contours of the slot surface 200 may be varied. The leading 34 and trailing 35 edges have a hydrodynamic profile with a cross section that is similar in shape to an airplane wing. This edge profile increases the flow 100 into the annulus area 51 as well as creates a smooth transition of the flow 100 into the central opening 240.

The central hole 240 is a region where the conservation of fluid momentum is maintained. This feature both eliminates the region of separation that previously existed behind the hub 20, and in addition, draws additional flow 100 through the surrounding turbine rotor disk area 51. Elimination of the region of separation also reduces the vibratory loading on the structure 10 resulting in improved reliability and therefore reduced maintenance cost.

This central hole 240 increases both the output torque, and therefore the overall efficiency of the tidal turbine 10.

The central hole 240 concept also has a positive environmental benefit in addition to its performance enhancing effects. This central region 240 provides a fish and marine mammal bypass in the event that this sea life enters the tidal turbine generator 10. The hole 240 through the centre is large enough to accommodate all types of fish, and the majority of other marine mammals (with the exclusion of large whales).

The area occupied by the central hole 240 is less than or equal to the area occupied by the turbine rotor disk 51. The exact ratio of these areas is determined by CFD analysis performed using site-specific parameters. The optimal hole 240 to turbine rotor disk area 51 ratio is between 1:15 and 1:1, but in variations other ratios may be employed to some advantage.

The hub 20 that defines the central hole 240 is an integral structural member of the tidal turbine generator 10. The radial load or force on the turbine 10 is transferred from the hub 20 to the guide vanes or struts 24 and then through to the primary structural member, the outer duct 40. This produces a very stiff and robust structure. The hub 20 houses a series of bearings 58 that provide the principal radial alignment and thrust support for the turbine rotor 50. Water lubricated, low friction bearings 58 are mounted at the turbine rotor hub 20. A central journal bearing 58 (or bearings) provides radial support for the rotor 50 and two thrust bearings 58 are located on either side of the rotor 50 to accommodate axial excursions resulting from the bi-directional hydrodynamic load on the turbine 10. An additional set of water lubricated bearings 58 is also employed at the blade (rotor) rim 54 location to counteract the axial thrust load of the rotor 50. This complete bearing arrangement 58 reduces the susceptibility of the turbine rotor 50 to racking. Optionally, a magnetic bearing system or any other bearing system that is well known in the art can be employed.

In the preferred embodiment, the hub 20 consists of marine grade stainless steel. An alternate embodiment includes a hub 20 manufactured from a composite material such as fiberglass, Kevlar™, Carbon fiber or any combination known in the art.

Figure 4:
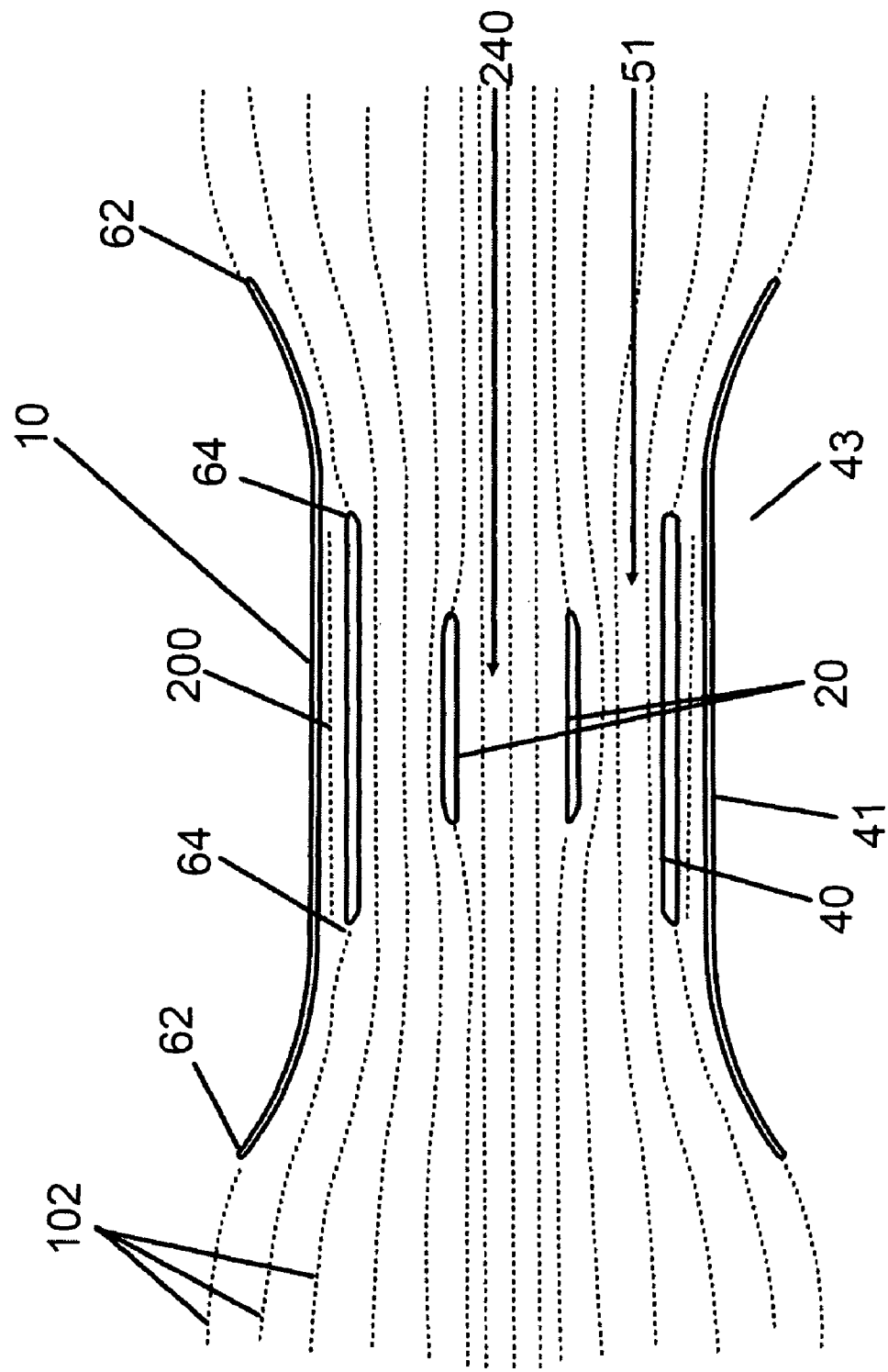
FIG. 4 is a side elevation sectional view of the hub and outer and augmentor ducts defining the slot and hole and showing flow streamlines according to the invention.

Referring now to FIG. 4, a side elevation sectional view of the hub and outer and augmentor ducts defining the slot and hole and showing flow streamlines 102 is shown. The flow streamlines 102 illustrate the flow enhancement features of this design. In variations, the geometry of the profile is varied in order to improve the flow characteristics for site-specific installations. The slot 200 geometry is a function of the characteristics of the tidal stream at the specific site; however, the slot area 200, or effective gap has a normal range of 10%-50% of the turbine rotor area or annulus 51. FIG. 4 illustrates the deflection of the flow streamlines 102 from the hole 240 and slot 200 area into the annulus 51, thereby increasing the flow onto the rotor 50 and thereby increasing the power output.

The fluid that enters the slot 200 maintains its momentum through the slot 200 and then imparts this momentum into the boundary layer of the diverging section of the dual augmentor duct 43. This injection of fluid has the effect of both delaying the region of separation on the divergent portion of the duct 43 as well as drawing additional flow through the enclosed annulus 51 area. The net result of these effects is a significant increase in performance in blade 30 torque, and therefore an overall efficiency improvement of the tidal turbine generator 10.

Figure 5:
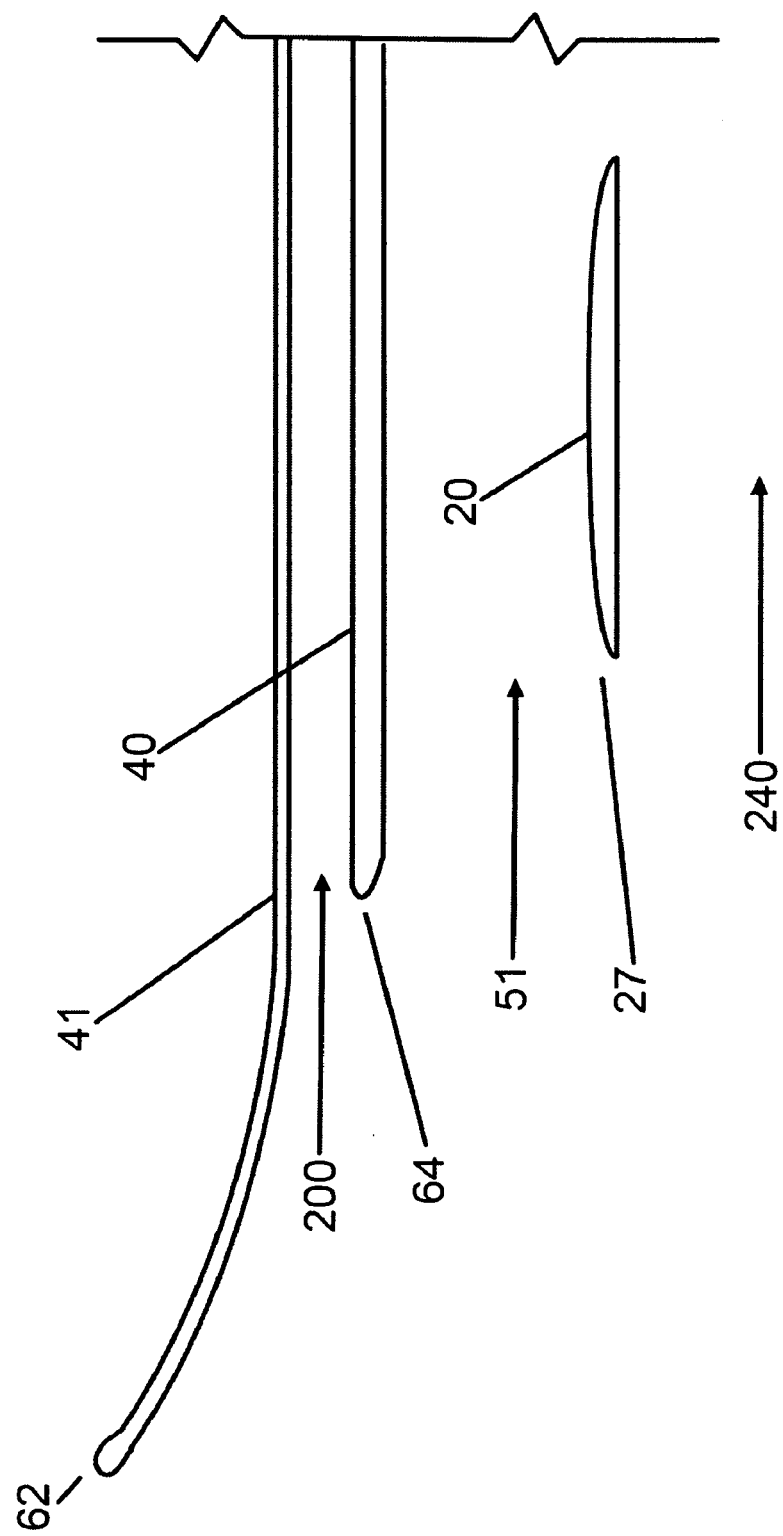
FIG. 5 is a side elevation detail view of the leading edges of the hollow hub and outer augmentor ducts.

Now referring to FIG. 5, a side elevation detail view of the leading edges of the hollow hub and outer and augmentor ducts is shown. The elliptical, fluid dynamic shape of the hub 20 rim 27, outer duct 40 rim 64, and the augmentor duct 41 rim 62, promote laminar flow and generator efficiency. The slot 200 and hole 240 are also shown.

Figure 6:
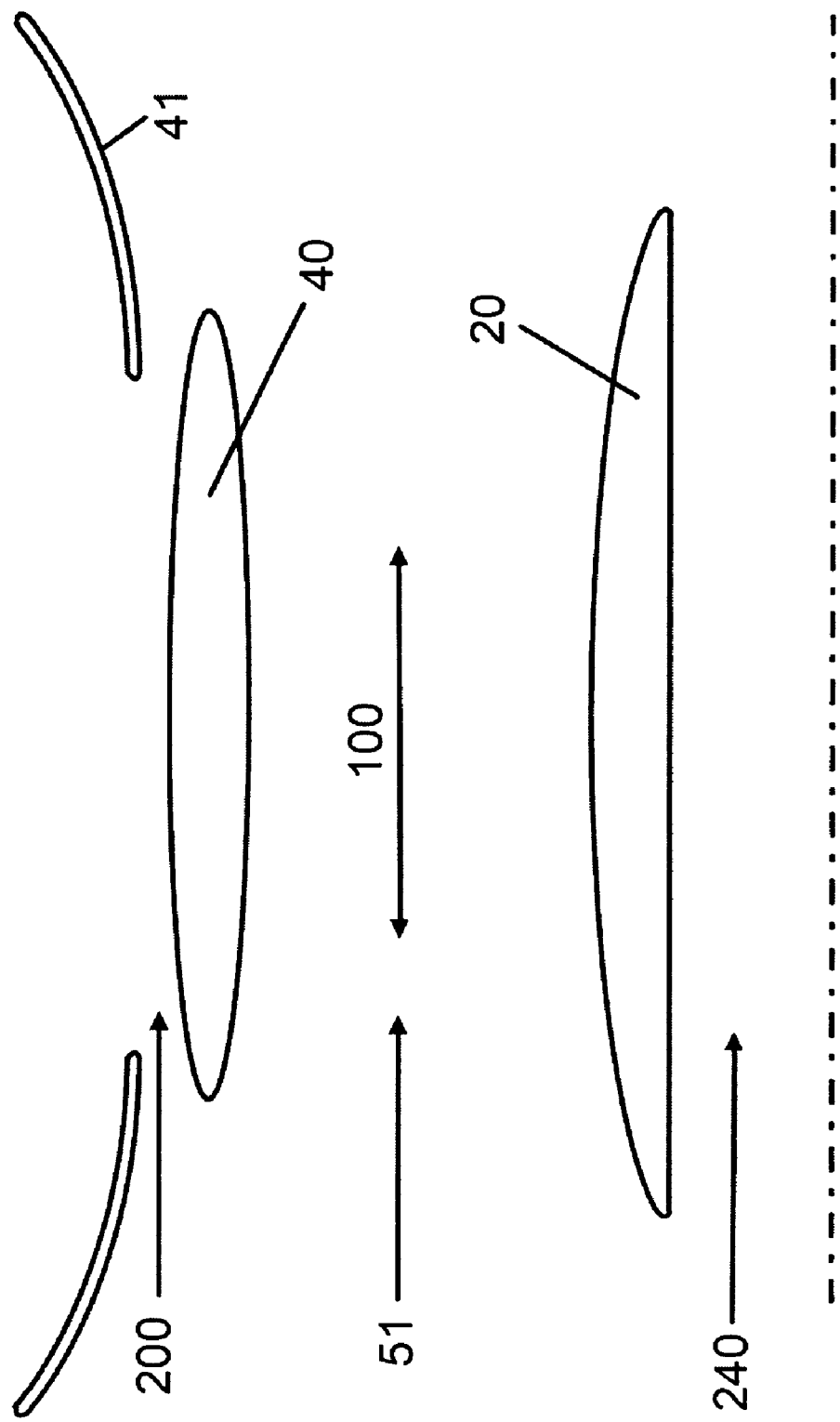
FIG. 6 is a side elevation sectional view of a dual augmentor duct open slot variation of the invention.

Now referring to FIG. 6, a side elevation sectional view of a dual duct with an open slot variation is shown. The slot 200 is discontinuous, and each augmentor duct rim 62 is supported by the struts 24. The water flow 100 is also shown.

Figure 7:
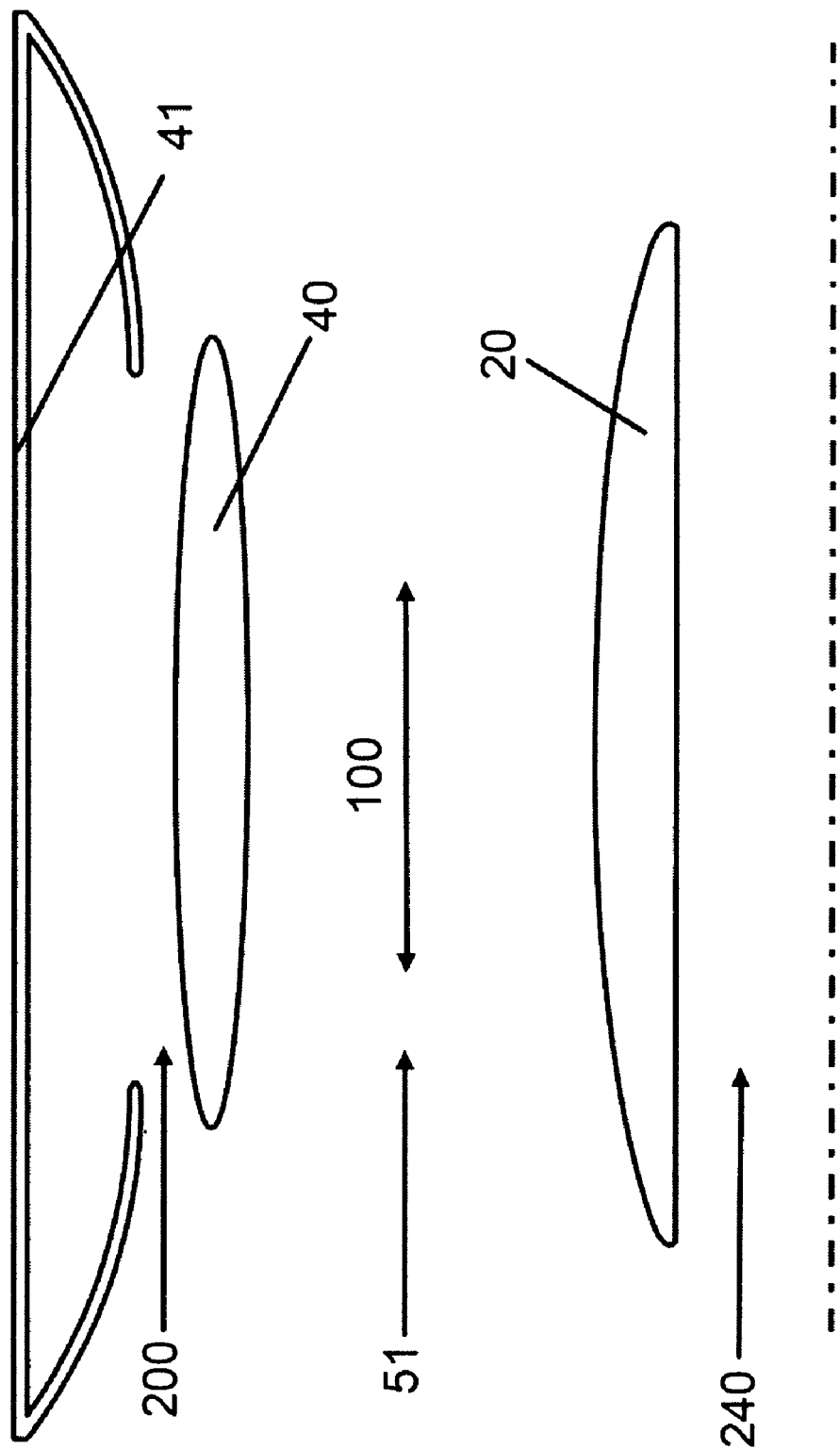
FIG. 7 is a side elevation sectional view of a cylindrical dual augmentor duct slot variation of the invention.

Now referring to FIG. 7, a side elevation sectional view of a dual cylindrical duct covered slot 200 variation of the invention is shown. The outer surface of the outer duct 40 is cylindrical in this variation.

In operation, the reduced vibrational loading on the tidal turbine generator 10, smoother laminar flow, increased water flow 100 through the rotor disks 50 due to the slot 200 and hole 240 features increase the output torque of the rotor disk 50 by above 50% in comparison to a similar turbine generator without the above-described flow enhancement structure, depending on the unit 10 type and site parameters, which in turn translates into an overall efficiency improvement of greater than 10%.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An improved turbine generator including at least one blade and a housing disposed about said turbine, wherein the improvement comprises a slot defined by an outer surface of said housing and an inner surface of an augmentor disposed about said housing, said augmentor having an inlet and an outlet which are substantially similar in area, thereby resulting in enhanced flow characteristics of said turbine generator, and wherein said turbine generator is bi-directional.

2. The improvement of claim 1 wherein said augmentor comprises a central throat portion disposed between said inlet and said outlet wherein the ratio of the area of said throat portion to said inlet and said outlet area is between 0.1 and 0.9, thereby creating a decelerating flow effect downstream of said slot and increasing the efficiency of said turbine generator.

3. The improvement of claim 1 wherein said augmentor is a second duct disposed about substantially all of said outer surface of said housing, thereby creating a dual duct structure.

4. The improvement of claim 1 wherein said slot area is 10-50% of an area described by a path of said at least one blade.

5. An improved bi-directional hydro turbine generator having a water flow area through at least one rotor disk, said improvement comprising outer slot and inner hole areas defined by dual ducts and a hub respectively, thereby conserving water velocity through said outer slot and inner hole areas and rendering said turbine generator more efficient, said dual ducts comprising an augmentor having an inlet and an outlet which are substantially similar in area.

6. The improvement of claim 5 wherein said inner hole area is operable to render said turbine generator more efficient by permitting water to flow substantially undisturbed through said inner hole area so as to reduce the effect on turbine efficiency of a region of separation located downstream of said turbine generator.

7. The improvement of claim 5 wherein the exterior of said dual ducts is flared at both ends, thereby creating a central throat area in said turbine which is narrower than said ends and thereby optimizes the bidirectional flow characteristics of said hydro turbine generator.

8. The improvement of claim 7 wherein said hub comprises curved edges at each end of said hub thereby rendering said hub hydrodynamic.

9. The improvement of claim 5 further comprising a plurality of guide vanes extending radially from said hub.

10. The improvement of claim 5 wherein said hub is rigid and comprises a rotor rim rotatable about the outer circumference of said hub.

11. The improvement of claim 5 wherein said at least one rotor disk comprises a plurality of blades and is adapted to rotate about said rigid hub.

12. The improvement of claim 5 further comprising a plurality of struts projecting radially from said hub to a housing disposed about said turbine generator, thereby reinforcing said turbine generator against vibration caused by increased water flow through said outer slot and inner hole areas.

* * * * *